(12) United States Patent
Meador et al.

(10) Patent No.: US 7,704,622 B1
(45) Date of Patent: Apr. 27, 2010

(54) ION CONDUCTING ORGANIC/INORGANIC HYBRID POLYMERS

(75) Inventors: Maryann B. Meador, Strongsville, OH (US); James D. Kinder, Canfield, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1396 days.

(21) Appl. No.: 10/926,457

(22) Filed: Aug. 26, 2004

(51) Int. Cl.
*H01M 8/10* (2006.01)

(52) U.S. Cl. .................. 429/30; 205/420; 205/431; 429/33; 428/28; 428/38

(58) Field of Classification Search .................. None
See application file for complete search history.

(56) References Cited

U.S. PATENT DOCUMENTS

| | | | |
|---|---|---|---|
| 4,209,455 A | 6/1980 | Pepe | 556/419 |
| 5,209,871 A * | 5/1993 | Mason | 252/500 |
| 5,283,310 A | 2/1994 | Armand | 528/30 |
| 6,059,943 A | 5/2000 | Murphy | 204/296 |
| 6,242,135 B1 | 6/2001 | Mushiake | 429/304 |
| 2005/0170255 A1 * | 8/2005 | Koh et al. | 429/316 |

OTHER PUBLICATIONS

"Block Copolymer Organic-Inorganic Networks. Structure, Morphology, and Thermomechanical Properties" authored by Matejka et al. and published in Polymer (2004) 45, 3267-3276.*
Technical data sheet for JEFFAMINE D-2000.*
"Block Copolymer Organic-Inorganic Networks. Formation and Structure Ordering" authored by Matejka et al. and published in Macromolecules 2003, 36, 7797-7985.*

* cited by examiner

*Primary Examiner*—Marc S Zimmer
(74) *Attorney, Agent, or Firm*—Robert H. Earp, III; James V. Tura

(57) ABSTRACT

This invention relates to a series of organic/inorganic hybrid polymers that are easy to fabricate into dimensionally stable films with good ion-conductivity over a wide range of temperatures for use in a variety of applications. The polymers are prepared by the reaction of amines, preferably diamines and mixtures thereof with monoamines with epoxy-functionalized alkoxysilanes. The products of the reaction are polymerized by hydrolysis of the alkoxysilane groups to produce an organic-containing silica network. Suitable functionality introduced into the amine and alkoxysilane groups produce solid polymeric membranes which conduct ions for use in fuel cells, high-performance solid state batteries, chemical sensors, electrochemical capacitors, electro-chromic windows or displays, analog memory devices and the like.

10 Claims, 4 Drawing Sheets

ION CONDUCTING ORGANIC/INORGANIC HYBRID POLYMERS

ORIGIN OF INVENTION

The invention described herein was made by employees of the United States Government and may be manufactured and used by or for the Government for governmental purposes without the payment of any royalties thereon or therefor.

FIELD OF THE INVENTION

This invention relates to a series of organic/inorganic hybrid polymers easy to fabricate into dimensionally stable films with good ion conductivity over a wide range of temperatures for use in a variety of applications. The hybrid polymers are formed by the reaction of amines and particularly the polyamines with epoxy-functionalized alkoxysilanes. The products of the reaction are subsequently polymerized by hydrolysis and condensation of the alkoxysilane group to produce an organic-containing inorganic network. Suitable functionality introduced into the amine or inorganic group such as an alkoxysilane produce membranes for use in fuel cells, high-performance solid state batteries, chemical sensors, electrochemical capacitors, electro-chromic windows or displays, analog memory devices and the like.

BACKGROUND OF THE INVENTION

A widely used polymeric membrane for use as a proton exchange membrane (PEM) in fuel cells is Nafion®. Nafion is a relatively expensive perfluorinated polymer which has an operating temperature in a fuel cell at approximately 80° C. Above 80° C., however, the membrane loses its effectiveness due to a loss of proton conductivity. The Nafion® membrane technology is well known in the art and is described in U.S. Pat. Nos. 3,282,875 and 4,330,654. Unreinforced Nafion® membranes are used almost exclusively as the ion-exchange membrane in solid polymer electrolyte-fuel cell (SPEFC) applications. The membrane is fabricated from a copolymer of tetrafluoroethylene (TFE) and perfluorovinyl ethersulfonyl fluoride. There are many advantages in operating a PEM fuel cell above 100° C. The advantages obtained when a PEM fuel cell is operated above 100° C. is that the rate of the reaction inside the fuel cell is increased, the catalyst is less susceptible to poisoning by carbon monoxide and the power density of the fuel cell is increased by the reduction of ancillary equipment such as humidifiers and compressors. There are many systems currently being investigated to replace Nafion for use in PEM fuel cells (J. Power Sources, 5044, 1-22, 2002). The most promising of these are the acid-doped polybenzimidazoles (Electrochimica Acta 43, 1289-1294, 1998), sulfonated polyetherketone (Solid State Ionics, 97, 1-15, 1997), and the sulfonated naphthalenic polyimides. However, a majority of the systems under investigation suffer from a lack of mechanical and thermal durability or poor performance. In addition, many of these systems offer no cost performance advantage over the current state-of-the-art.

Lithium based polymer batteries for aerospace applications, for example, need the ability to operate at temperatures ranging from about −70° C. to 70° C. Current state-of-art solid polymer electrolytes (SPE), (based on amorphous polyethylene oxide, PEO) have acceptable ionic conductivities (10E-4 to 10E-3 S/cm) only above 60° C. PEO has moderate lithium conductivity at room temperature (10E-6 S/cm). In addition, it is difficult to process and except for the very high molecular weight polymers not very dimensionally stable. Higher conductivity can be achieved in current PEO systems by the addition of solvents or plasticizers to the solid polymer to improve ion transport. However, these approaches typically compromise dimensional and thermal stability of the electrolyte as well as compatibility with electrode materials. Thus, there is intense interest in developing new electrolytes with acceptable room temperature ionic conductivity without the need for solvents or plasticizers. Some of these new approaches include combinations of polymers (Electrochimica Acta, 43, 1177-1184, 1998), hyperbrached systems (Macromolecules, 29, 3831-3838, 1996), highly ordered Lanmuir-Blogett films (J. Power Sources, 97-98, 641-643, 2001) and polyphosphazenes (Chemistry of Materials, 13, 2231-2233, 2001). All of the aforementioned approaches for lithium battery applications produce electrolytes with a higher ionic conductivity than PEO, but not high enough for future applications and all suffer from poor dimensional stability.

Accordingly, research and development has now focused on the development of proton-exchange membrane fuel cells. In brief, proton-exchange membrane fuel cells have a polymer electrolyte membrane between a positive electrode (cathode) and a negative electrode (anode). The polymer electrolyte membrane is composed of an ion-exchange polymer. It provides for ionic transport and prevents mixing of the molecular forms of the fuel and the oxidant. Solid polymer electrolyte fuel cells (SPEFCs) are a source of quiet, efficient, power. While batteries have reactants within their structure, fuel cells use air and hydrogen to operate. Their fuel efficiency is high, they are quite, operate over a wide power range and are relatively easy to manufacture. For example, during fuel cell operation, hydrogen permeates through the anode and interacts with the catalyst producing electrons and protons. The electrons are conducted by an electrically conductive polymeric membrane through an external circuit to the cathode, while the protons are transferred by an ionic route through the electrolyte membrane to the cathode. Oxygen permeates to the cathode, where it gains electrons and reacts with protons to form water. The products of the SPEFC's reactions are water, electricity and heat.

However, despite their potential, SPEFC have not been commercialized to a large extent due to unresolved technical problems and overall high cost. To make the SPEFC commercially viable, the membranes should operate at elevated temperatures (>120° C.) to increase power density and limit catalyst sensitivity to impurities. Thus, the problems of using solid polymer electrolyte membranes in electrochemical systems, such as fuel cells, at elevated temperatures have not been solved by the electrolyte membranes presently available. Therefore, it is important to develop solid polymer electrolyte membranes that have high proton conductivity, good mechanical strength and long term stability at temperatures above 120° C. and low relative humidity.

SUMMARY OF THE INVENTION

The present invention relates to the reaction of amines, particularly the polyamines and epoxy-functionalized alkoxysilanes to form hybrid polymers that can be used to conduct ions for a variety of applications. Synthesis of these polymers can be easy and versatile and can be made from relatively low cost starting materials. The advantage of the present invention is that the new polymer system has many beneficial properties such as ionic conductivity, thermal and mechanical stability and potentially low cost. The ability of these organic/inorganic hybrid polymers to conduct ions while maintaining their thermal and mechanical properties is useful for many applications including fuel cells, high-energy density batteries, chemical sensors and the like. The unique molecular structure of these organic/inorganic hybrid polymers also allows for the coordination of many types of organic and inorganic additives that can further enhance their performance for a particular application. When used in a fuel cell application, for example, these organic/inorganic hybrid polymers can potentially lower the cost while at the same time increase the performance and energy density of the cell by allowing the fuel cell to operate at elevated temperatures. The organic/inorganic hybrid polymers can also decrease the operating temperature and improve the energy density of lithium polymer batteries allowing for its use in many aerospace and terrestrial applications. In addition, the organic/inorganic hybrid polymers eliminates the need for solvents in a typical battery application which improves the safety and environmental impact as well as simplifying the battery construction process.

Accordingly, it is an object of this invention to provide organic-inorganic hybrid polymers as membranes to conduct ions while maintaining their thermal and mechanical stability at temperatures of 120° C. and higher.

It is another object of this invention to provide thermal and mechanical stable organic-inorganic hybrid polymers having ion-conductivity derived from the reaction of effective amounts of at least one amine e.g. polyamine and an epoxy-functionalized alkoxysilane. An effective amount is at least the stoichiometric amount needed to obtain the hybrid polymers.

It is another object of this invention to provide novel organic-inorganic hybrid polymers for use in many applications including fuel cells, high-energy density batteries, chemical sensors, and various other electrochemical devices.

It is another object of this invention to provide hybrid polymer electrolyte membranes having high ionic conductivity, high mechanical strength, chemical stability during oxidation and hydrolysis, and stability at elevated temperatures.

It is another object of this invention to provide methods for producing these hybrid polymer electrolyte membranes.

It is still a further object of this invention to develop a series of hybrid membranes that have good proton conductivity (>$10^{-2}$ S/cm) at temperatures above 120° C., low relative humidity (<25% RH) and to significantly reduce the cost of the (PEM) membrane.

It is still a further object of this invention to provide solid-polymer electrolyte membranes for use in the preparation of lithium batteries and fuel cells.

The foregoing and other objects will become better understood with reference to the following description of this invention.

DETAILED DESCRIPTION OF A PREFERRED EMBODIMENT

Figure 1:
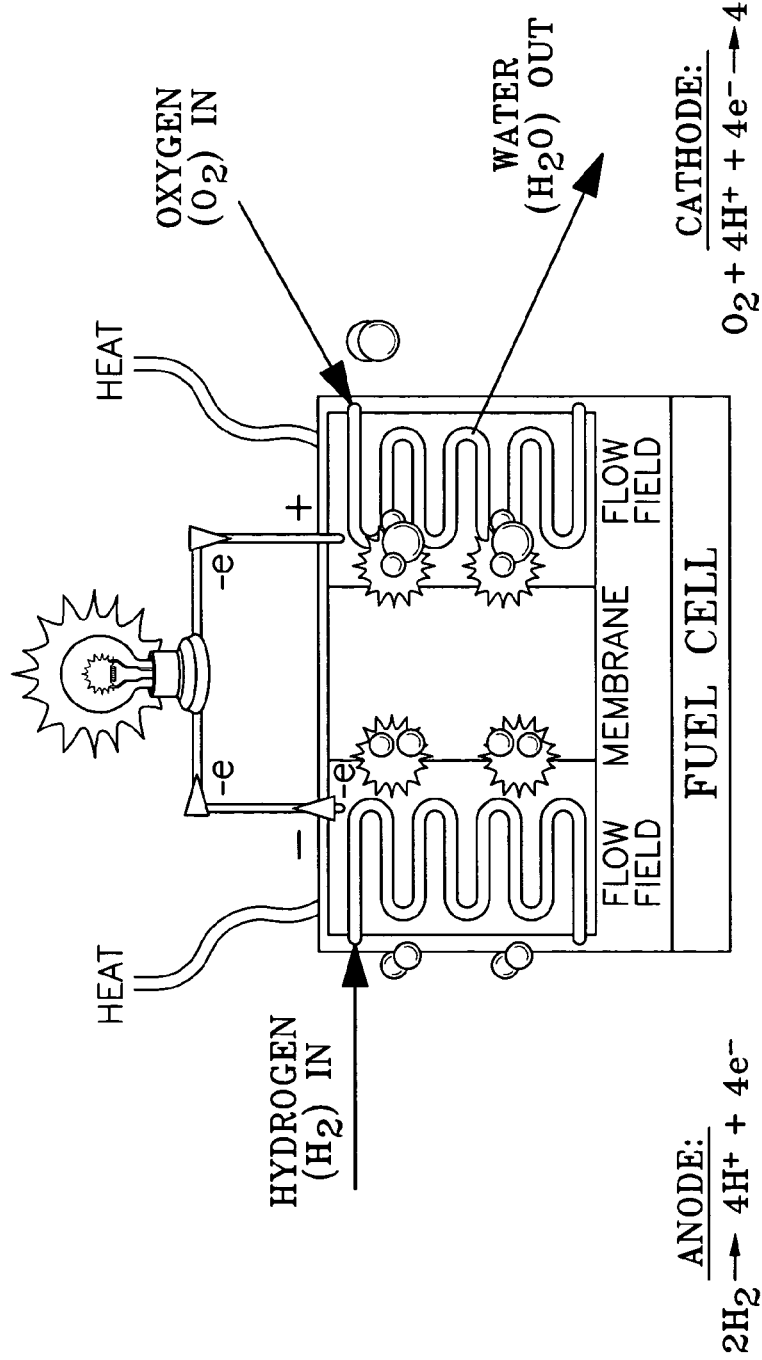
FIG. 1 shows basic PEM fuel cell operation.
Figure 2:
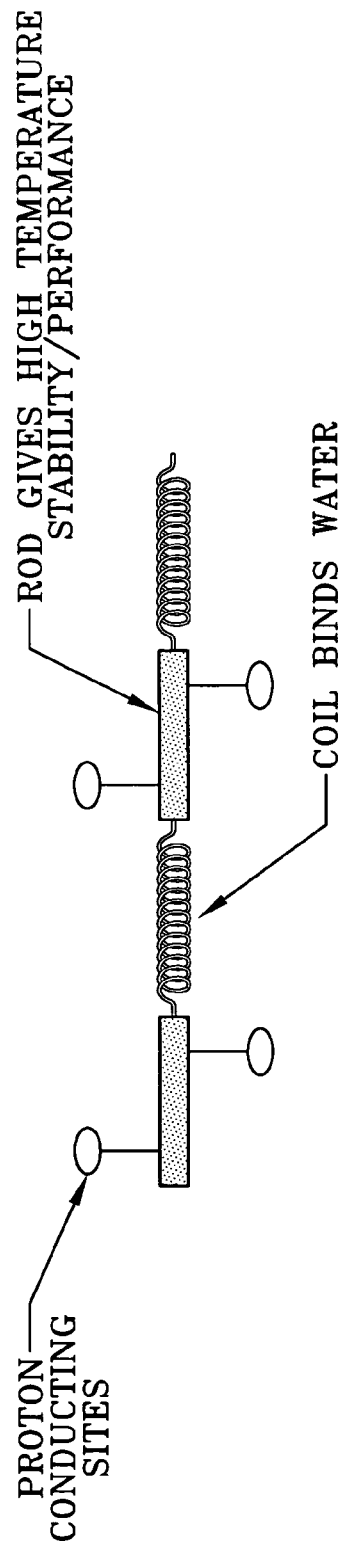
FIG. 2 shows that the new polymer membranes can increase PEM fuel cell operating temperatures.
Figure 3:
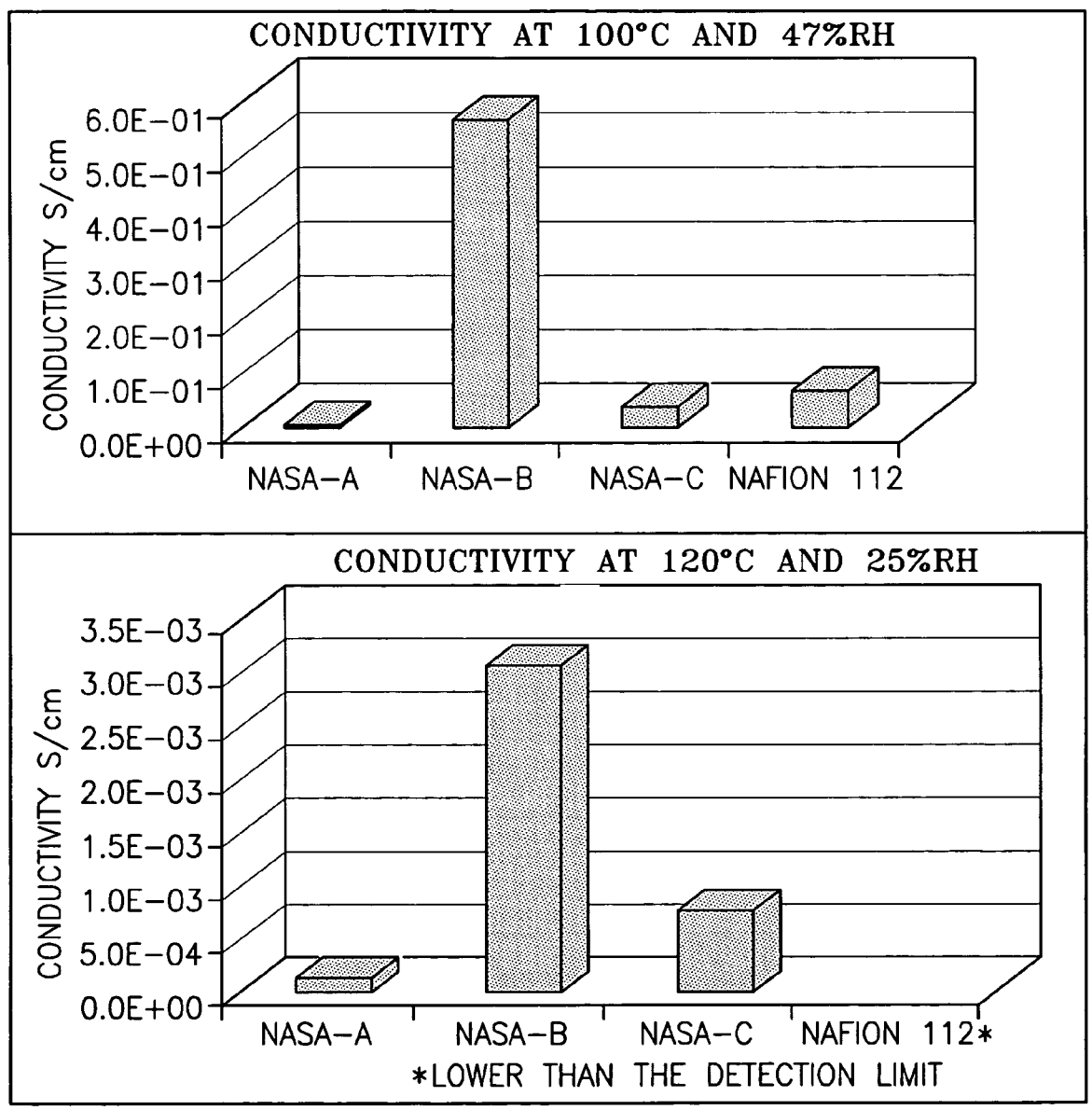
FIG. 3 shows PEM membranes having good conductivity at high temperatures and low relative humidity.
Figure 4:
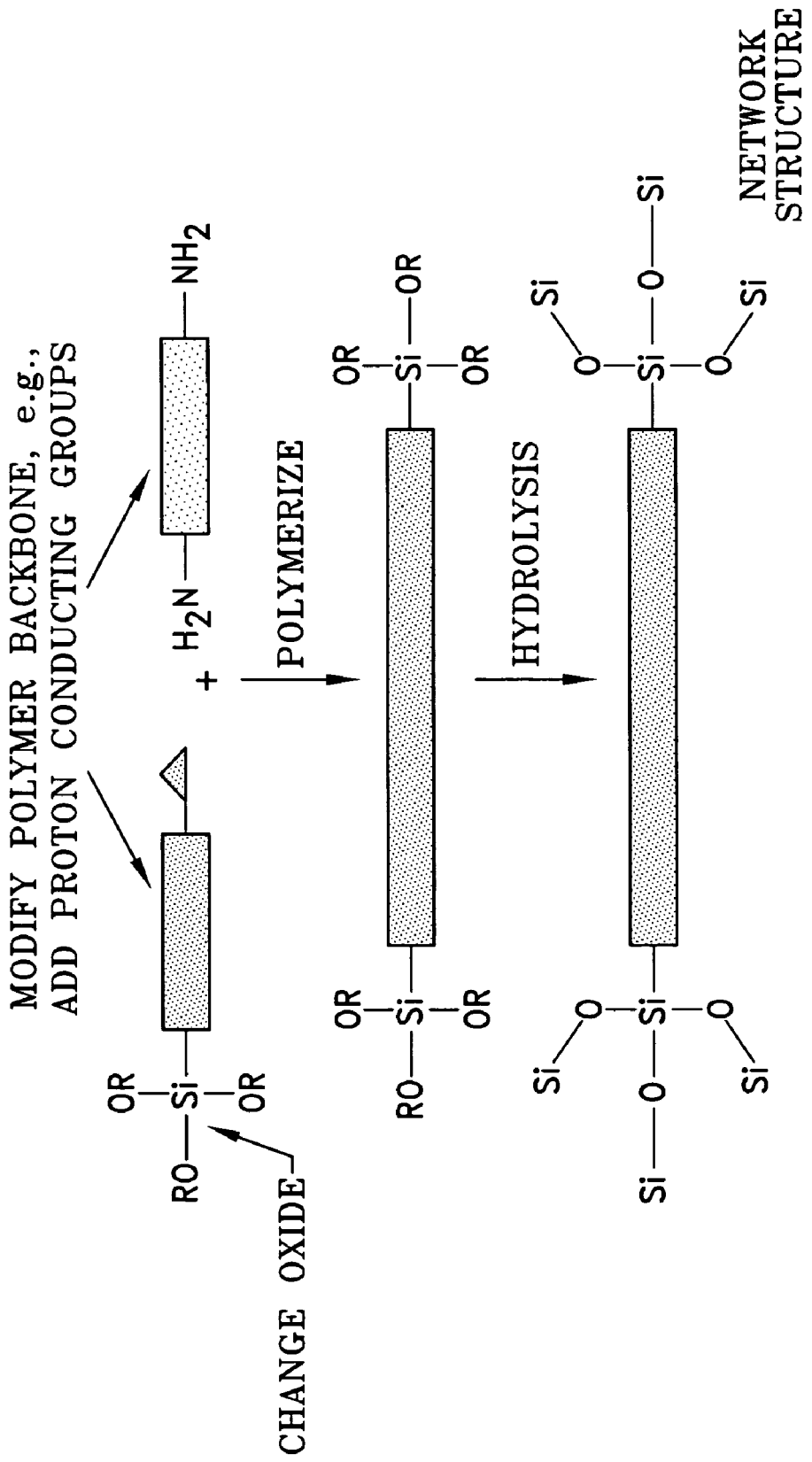
FIG. 4 shows ORMOSILS flexibility in membrane design.

This invention relates to a series of organic/inorganic hybrid polymers that are easy to fabricate and to produce mechanically resilient films with acceptable ionic conductivity for a variety of applications including fuel cells, lithium batteries and various other electrochemical devices. The hybrid polymers of this invention are synthesized by the reaction of at least one amine selected from the group consisting of monoamines, polyamines and mixtures thereof in any ratio with an epoxy-functionalized alkoxysilane. The products of the reaction are subsequently polymerized by hydrolysis and condensation of the alkoxysilane group to produce an organic-containing inorganic network. An illustration of a representative reaction is shown below in Scheme 1. The inorganic-containing network can not only improve the mechanical properties of the organic/inorganic polymer system it can also be engineered to improve the ionic conductivity of the polymer system. The ability to vary both the functionality of the polyamine and the epoxy-functionalized alkoxysilane used in the synthesis provides the flexibility to design and optimize the polymers for a particular application.

More specifically, preparation of the organic-inorganic hybrid polymers of this invention is illustrated in Scheme I by the following reaction:

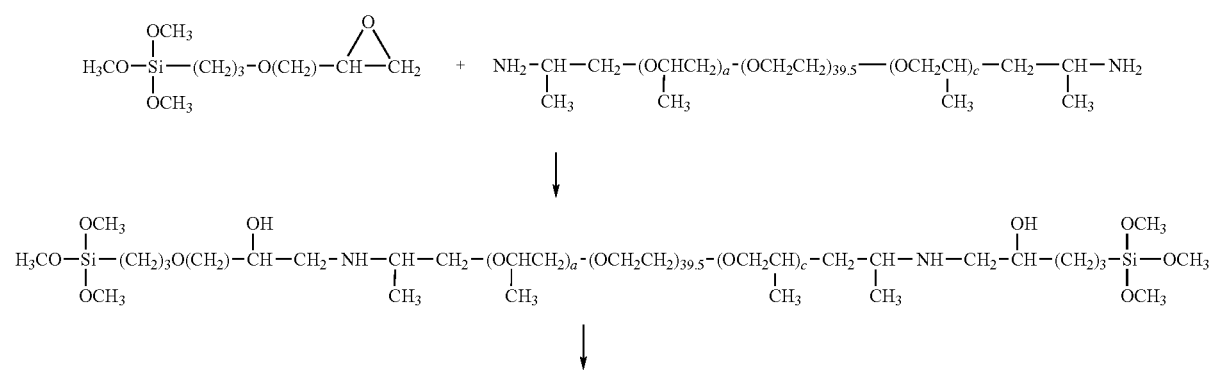

-continued
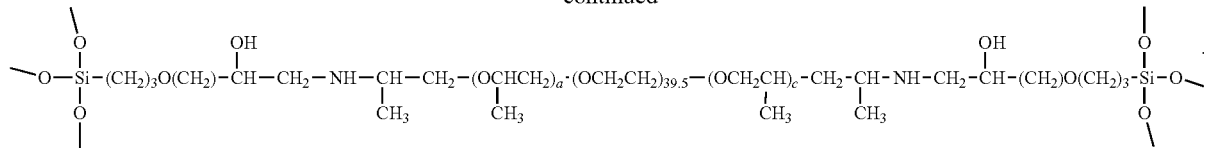

The following data provides the analysis of the organic/inorganic hybrid polymers of this invention.

Example 1

10.3870 g of 2000 MW PEO diamine (2000 DA), 2.45 g of 3-Glycidoxypropyl-trimethoxysilane (GLYMO) and 50 ml of dry NMP were combined in a 3 neck flask equipped with a reflux condenser. The flask was heated to 180° C. under nitrogen for 4.5 hours. The NMP was removed under reduced pressure and 50 ml of THF and 2.24 g of $H_2O$ was added to the GLYMO-2000 DA monomer. The reaction was stirred for 30 min and then poured into 25 ml Teflon pans. The pans were partially covered and left in a fume hood for 24 hours. The remaining solvent was removed by heating to 160° C. for 5 hrs. under reduced pressure in a vacuum oven.

The organic solvents useful in the reaction for preparing the hybrid polymers include, for example, N,N-dimethylformamide, N,N-dimethylacetamide, tetrahydrofuran (THF), N-methyl-2-pyrrolidinone (NMP), N,N-diethylacetamide, N,N-dimethylmethoxyacetamide, N-methyl-2-pyrrolidone, bis(2-methoxyethyl)ether, tetrahydrofuran, 1,3-dioxane, pyridine, dimethyl sulfoxide, dimethyl sulfone, cresol, cresylic acid, xylenol and various mixtures thereof.

For purposes of this invention, the silanes can be characterized as compounds containing one silicon atom per molecule bonded to at least one epoxy-containing group, and at least one silicon-bonded alkoxy group. The alkoxy groups can have up to four carbon atoms including the methoxy, ethoxy, propoxy and butoxy groups. For purposes of this invention "epoxy" refers to the structural group:

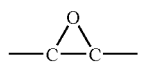

The epoxy silanes include, for example, the mono(epoxyorgano)trialkoxysilanes wherein the epoxyorgano group is specifically illustrated by the formula:

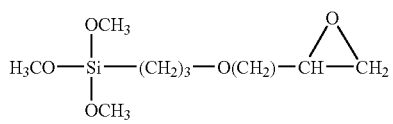

A preferred example of an epoxy-functionalized alkoxysilane includes 2-(3,4-epoxypropoxy)propyltrimethoxysilane, and the partial hydrolyzates thereof. The organosilane can be characterized by the general formula:

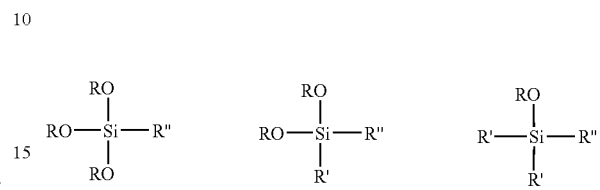

wherein R is a monovalent radical having up to 20 carbon atoms and may contain ether oxygen atoms. R includes alkyl, alkoxyalkyl, or phenyl groups. R' is an organic radical having from 2 to 20 carbon atoms. R' includes the alkenyl, alkynyl, phenyl, phenoxy, alkenoxy and alkoxy groups, such as the allyloxy, butenoxy, and pentenoxy groups. R' can also contain ether, ester, nitrile, amide, amine, halogen, aldehydes, ketones, carboxylic acids, anhydride, and lactone functional groups. R" can be a monovalent hydrocarbon, alkyl, alkenyl, alkynyl, phenyl, phenoxy, alkenoxy, ether, containing an epoxy group of the general formula:

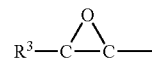

wherein $R^3$ is a divalent hydrocarbon group, ether oxygen or hydroxyl containing hydrocarbon group. Examples of $R^3$ include methylene, ethylene, and propylene such as,

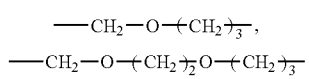

The organosilanes can be prepared by known techniques by reacting an epoxy-functional alkoxy silane with alcohols of aliphatic unsaturated e.g. $C_2$-$C_4$ hydrocarbons, including, for example, allyl alcohol, or by reacting a tri(alkoxyalkyloxy) silane with epoxy alcohols.

The amines useful in preparing the hybrid polymers of this invention include the monoamines and the polyamines including the triamines and particularly the diamines, such as the aromatic diamines containing at least one benzene ring including para-phenylenediamine, 4,4'-diamino-diphenylpropane, 4,4'-diamino-diphenylmethane, diamine benzene, 1,5-diamino-napthalene, bisaniline-p-xylidene, 3,3'-diaminobenzophenone, 4,4'-diaminobenzophenone, 3,3'-diaminodiphenylether, 4,4'-diaminodiphenylmethane, 3,3'-dimethyl benzidine and various triamines such as 1,3,5-triaminobenzene, 4,4',4"-triaminotriphenylmethane, 4,4',4"-triaminotriphenylcarbinol and triaminophenyl benzene. The monoamines can be used as a mixture with the polyamines, and include, for example, the aromatic monoamines, aniline, o-toluidine, 2,3-xylidine, 3,4-xylidine, o-aminophenol, m-aminophenol, m-phenetidine, m-aminobenzaldehyde, aminobenzaldehyde, aminobenzonitrile, aminobenzonitrile, 2-aminobiphenyl, 4-aminobiphenyl, 2-aminophenyl phenyl ether, 3-aminophenyl phenyl ether, 2-aminobenzophenone, 3-aminobenzophenone, 3-aminophenyl phenyl sulfide, naphthylamine, amino-2-naphthol, 2-amino-1-naphthol and the like. For purposes of this invention, the preferred diamines include the alkylene diamines wherein the alkylene group has from 2 to 8 carbons and preferably from 2 to 4 carbons such as polyoxyethylene diamine, polyoxypropylene diamines, polyoxybutylene diamine and various mixtures thereof.

The monoamines include, for example, the aliphatic monoamines having 1 to 18 carbons e.g. 1 to 8 carbons and various mixtures thereof in any ratio with the aromatic monoamines including aniline, o-toluidine, 2,3-xylidine, 3,4-xylidine, aminophenol, m-aminophenol, aminobenzaldehyde, aminobenzonitrile, 2-aminobiphenyl, 4-aminobiphenyl, 2-aminophenyl phenyl ether, 3-aminophenyl phenyl ether, 2-aminobenzophenone, 3-aminobenzophenone, 3-aminophenyl phenyl sulfide, naphthylamine, amino-2-naphthol, 2-amino-1-naphthol and various mixtures thereof in any ratio.

Other diamines include the sulfonated diamines. These aromatic and aliphatic diamines useful in preparing the hybrid polymers can be characterized as having the general formula:

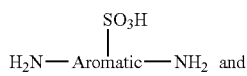

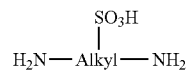

Specific examples of these aromatic diamines include:

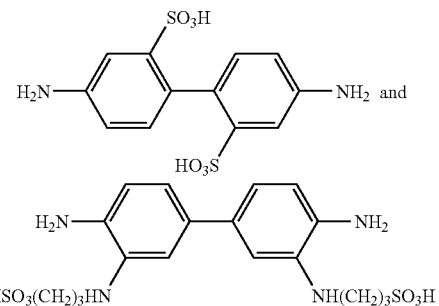

The sulfonated aliphatic or alkyl diamines contain alkyl groups having up to eight carbon atoms and preferably up to four carbons. Specific examples of sulfonated aromatic diamines preferably include 1,4-diaminobenzene-3-sulphonic acid, 4,4'-diamino-1-1'-biphenyl-2,2'-disulphonic acid, 4,4'-diamino-2,2'-biphenyldisulfonic acid and various combinations thereof. In addition to the sulfonate groups e.g. the sulfonated alkyl or aryl diamines, other strong acid groups that provide high ionic conductivity in the polymeric membrane include the carboxylic acid and phosphoric acid groups. More specifically, preparation of the organic-inorganic hybrid polymers of this invention is illustrated in Scheme II by the following reaction:

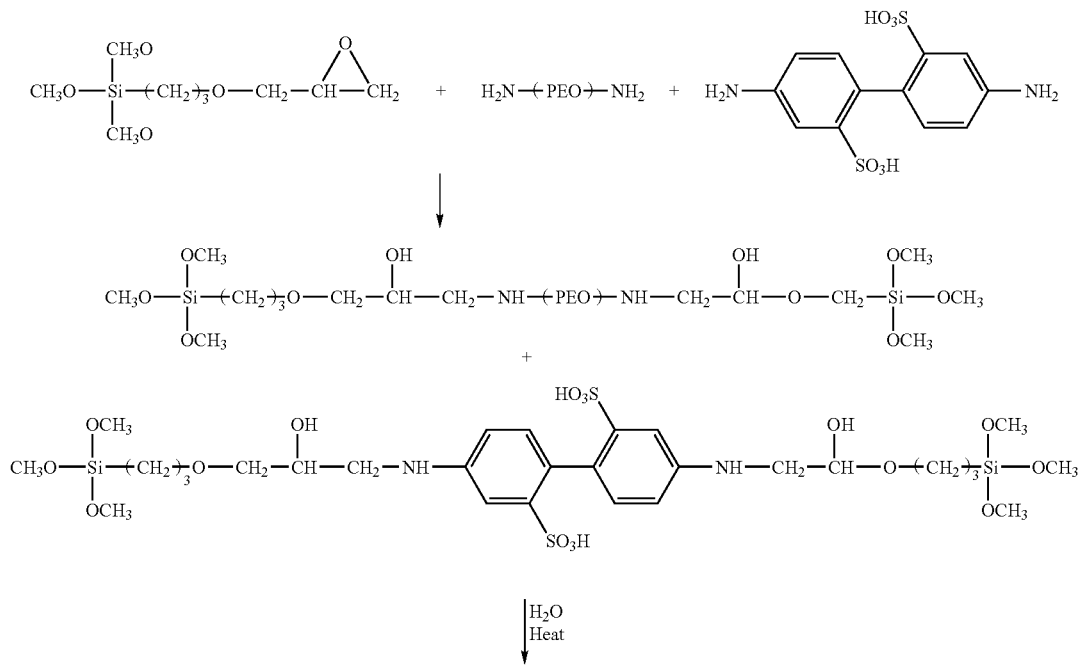

-continued

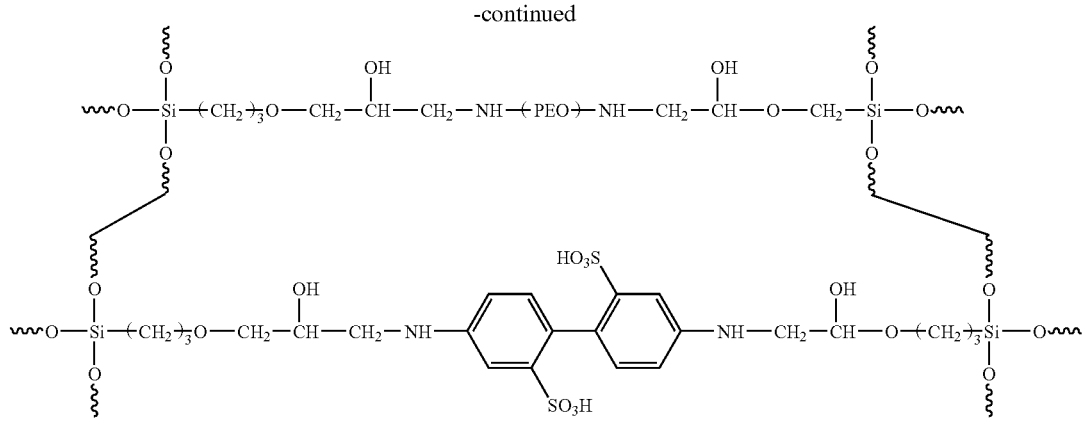

Example 2

The synthesis of 60/40 DAS began with the addition of 3-glycidoxypropyltrimethoxysilane (Glymo, Aldrich, 98%) to 2000 molecular weight (MW) Jeffamine (Huntsman XTJ-502) and 4,4'-diamino-2,2'-biphenyldisulfonic acid (DAS, Aldrich) in a molar ratio of 2:1, Glymo:(2000 MW Jeffamine+DAS). In addition, triethylamine (NEt$_3$, Aldrich 99.5%) was added in a molar ratio of 2.1:1, NEt$_3$:DAS. The molar percentage of DAS is determined by (mol DAS)/(mol DAS+ mol 2000 MW Jeffamine)×100%. The solution stirred in 50 ml N-methylpyrrolidone (NMP) (Aldrich, 99.5%) at 180° C. for 4.5-8 hours. Upon completion, the solvent was removed by evaporation under pressure. The remaining solution was diluted with approximately 5 ml tetrahydrofuran (THF) and water, 3:1 molar ratio water:silane. The 60/40 DAS/Jeffamine solution was then poured onto plates and allowed to dry under ventilation hoods. Curing of the films were done the following day in a vacuum oven set at 160° C. under a slight vacuum (approximately 10 in Hg) for 3-4 hours. A full vacuum was pulled for the last hour of heating and an additional hour to remove any additional solvent. Thin, flexible, free-standing films resulted.

With regard to utility, the ion-conducting hybrid polymers of this invention are particularly useful for the preparation of lithium batteries. The increased power demands of electronic devices have intensified research in both industry and academia in the area of rechargeable lithium-ion batteries. There is especially an interest in constructing a lithium battery that incorporates a solid polymer electrolyte. A lithium battery that utilizes a solid polymer electrolyte offers many advantages over liquid electrolyte based batteries including a decrease in health, safety, and environmental hazards with an increase in design flexibility and predicted power density.

In preparing the membrane for use in the battery, the polymer was synthesized by reacting 3-Glycidoxypropyl-trimethoxysilane (GLYMO) with a 2000 MW polyethylene oxide diamine to produce a flexible self-standing membrane after curing. The solid polymer electrolyte (SPE) membrane was prepared by the addition of a lithium salt at various ethylene oxide unites to lithium ratios.

Synthesis of the novel siloxane polymer is illustrated in Scheme III. The polyetherdiamine reacts with the GLYMO to form a β-hydroxyamine silane monomer. Lithium sulfonamide salt is added to a THF solution of the monomer at various ethylene oxide oxygen (EO) to lithium ratios. The β-hydroxyamine silane monomer is then crosslinked by the hydrolysis of the methoxysilane groups to form a flexible xerogel film upon removal of the solvent.

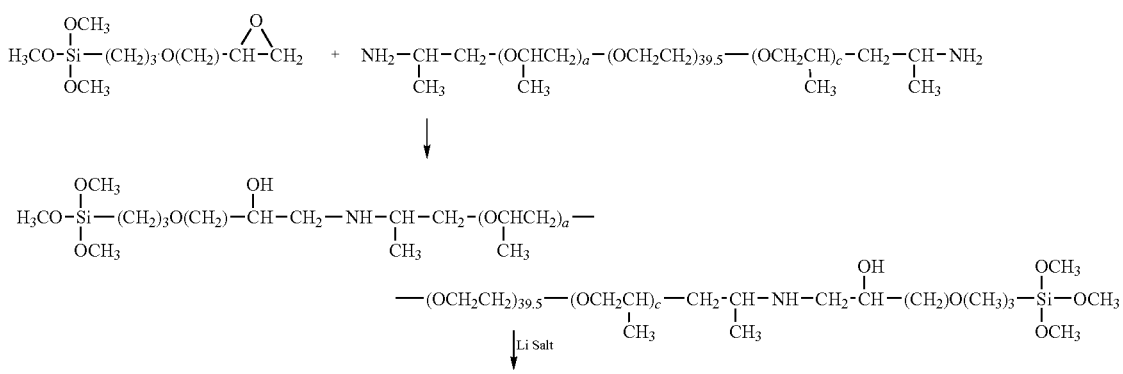

Scheme III

-continued

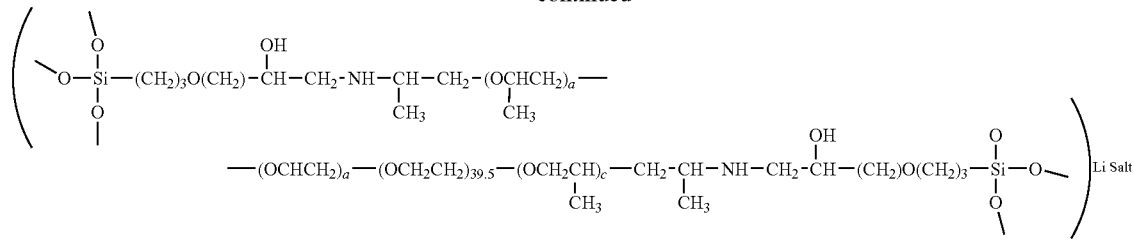

Example 3

The synthesis of lithium containing polymer began with the addition of 3-glycidoxypropyltrimethoxysilane (GLYMO) to 2000 molecular weight (MW) polyether diamine in a molar ratio of 2:1 Glymo:2000 MW PEO. The solution stirred in 50 ml N-methylpyrrolidone (NMP) at 180° C. for 4.5-8 hours. Upon completion, the solvent was removed by evaporation under pressure. The remaining solution was diluted with approximately 5 ml tetrahydrofuran (THF) and water, 3:1 molar ratio water:silane.

Lithium trifluoromethane-sulfonimide (Li salt, Aldrich, 99.95%) was added in a 20:1 ether oxygen to lithium molar ratio. An additional 2 ml THF was used to dissolve the Li salt and the resulting solution was added to the Glymo 2000 solution. The Glymo 2000-Li was then poured onto plates and allowed to dry under ventilation hoods. Curing of the films were done the following day in a vacuum oven set at 160° C. under a slight vacuum (approximately 10 in Hg) for 3-4 hours. A full vacuum was pulled for the last hour of heating and an additional hour to remove any additional solvent. Flexible free-standing films were obtained.

In lithium-ion batteries, one or more lithium compounds, preferably the salts can be used including, for example, $LiClO_4$, $LiBF_4$, LiCl, $LiSO_3CH_3$, $LiSO_3CF_3$, $LiN(SO_2CF_3)_2$, $LiC(SO_2CF_3)_3$ and various combinations thereof. The lithium compounds are added to the reaction in amounts ranging from about 35 to 1.0, ether oxygen to lithium molar ratio, and preferably at molar ratios from about 15-25 to 1.0 e.g. 20 to 1.0 of ether oxygen to lithium.

The inorganic network in the inorganic/organic hybrid polymer system of this invention can further be modified by the addition of various inorganic alkoxides such as vanadium oxytripropoxide, tetraethoxysilane, titanium ethoxide, and various other inorganic alkoxides during the synthesis of the polymer. Other alkoxides of metals include, for example, the alkoxides of aluminum, magnesium, nickel, zinc, sodium, and other known metal alkoxides. The composition range of the addition of the inorganic alkoxides range from about 1.0 to ninety e.g. about 20 to 80 weight percent. Examples of the reactions are set forth below.

Example 4

The synthesis of Glymo 2000 began with the addition of 3-glycidoxypropyltrimethoxysilane (Glymo, Aldrich, 98%) to 2000 molecular weight (MW) Jeffamine (Huntsman XTJ-502) in a molar ratio of 2:1 Glymo/2000 MW Jeffamine. The solution stirred in 50 ml N-methylpyrrolidone (NMP) (Aldrich, 99.5%) at 180° C. for 4.5-8 hours. Upon completion, the solvent was removed by evaporation under pressure. The remaining solution was diluted with approximately 5 ml tetrahydrofuran (THF) and water, 3:1 molar ratio water:silane.

Vanadium (V) oxytripropoxide (Vanadium propoxide, Aldrich, 98%) was added by weight percent to the Glymo 2000 solution. For example, a Glymo 2000-10 wt % Vanadium propoxide film would be synthesized by adding 0.400 g Vanadium propoxide to 4.000 g Glymo 2000. The Glymo 2000-Vanadium propoxide was then poured onto plates and allowed to dry under ventilation hoods. Curing of the films were done the following day in a vacuum oven set at 160° C. under a slight vacuum (approximately 10 in Hg) for 34 hours. A full vacuum was pulled for the last hour of heating and an additional hour to remove any additional solvent. Flexible free-standing films resulted.

Example 5

The synthesis of Glymo 2000 began with the addition of 3-glycidoxypropyltrimethoxysilane (Glymo, Aldrich, 98%) to 2000 molecular weight (MW) Jeffamine (Huntsman XTJ-502) in a molar ratio of 2:1, Glymo:2000 MW Jeffamine. The solution stirred in 50 ml N-methylpyrrolidone (NMP) (Aldrich, 99.5%) at 180° C. for 4.5-8 hours. Upon completion, the solvent was removed by evaporation under pressure. The remaining solution was diluted with approximately 5 ml tetrahydrofuran (THF) and water, 3:1 molar ratio water:silane.

Tetraethyl orthosilicate (TEOS, Aldrich, 98%) was added by weight percent to the Glymo 2000 solution. For example, a Glymo 2000-80 wt % TEOS film would be synthesized by adding 3.200 g TEOS to 4.000 g Glymo 2000. The Glymo 2000-TEOS was then poured onto plates and allowed to dry under ventilation hoods. Curing of the films were done the following day in a vacuum oven set at 160° C. under a slight vacuum (approximately 10 in Hg) for 3-4 hours. A full vacuum was pulled for the last hour of heating and an additional hour to remove any additional solvent. Flexible free-standing films resulted.

Example 6

The synthesis of Glymo 2000 began with the addition of 3-glycidoxypropyltrimethoxysilane (Glymo, Aldrich, 98%) to 2000 molecular weight (MW) Jeffamine (Huntsman XTJ-502) in a molar ratio of 2:1 Glymo/2000 MW Jeffamine. The solution stirred in 50 ml N-methylpyrrolidone (NMP) (Aldrich, 99.5%) at 180° C. for 4.5-8 hours. Upon completion, the solvent was removed by evaporation under pressure. The remaining solution was diluted with approximately 5 ml tetrahydrofuran (THF) and water, 3:1 molar ratio water:silane. Lithium trifluoromethane-sulfonimide (Li salt, Aldrich, 99.95%) was added in a 20:1 ether oxygen to lithium molar ratio. An additional 2 ml THF was used to dissolve the Li salt and the resulting solution was added to the Glymo 2000 solution. Vanadium (V) oxytripropoxide (Vanadium propoxide, Aldrich, 98%) was added by weight percent to the Glymo 2000 solution. For example, a Glymo 2000-10 weight percent Vanadium propoxide film is synthesized by adding 0.400 g Vanadium propoxide to 4.000 g Glymo 2000. The Glymo 2000-Vanadium propoxide was then poured onto plates and allowed to dry under ventilation hoods. Curing of the films were done the following day in a vacuum oven set at 160° C. under a slight vacuum (approximately 10 in Hg) for 3-4 hours. A full vacuum was pulled for the last hour of heating and an additional hour to remove any additional solvent. Flexible free-standing films resulted.

While this invention has been described with the preferred embodiments, it will be appreciated that various modifications and variations will be apparent to one skilled the in art and that such modifications and variations are within the scope of the appended claims.

The invention claimed is:

1. Solid-polymer electrolyte membranes comprising an organic-inorganic hybrid polymer derived from the reaction of effective amounts of at least one amine selected from the group consisting of polyamines, and mixtures of polyamines and monoamines with an epoxy-functionalized alkoxysilane and a lithium compound to obtain silane monomers; subsequently hydrolytically-condensing said monomers to obtain electrolyte membranes.

2. The membranes of claim 1 wherein at least one of the polyamines is a poly(ethylene oxide) diamine and the alkoxysilane is 3-glycidoxypropyltrimethoxysilane.

3. The membranes of claim 1 wherein the lithium compound is a lithium salt present in a molar ratio of about 20 to 1.0 of ether-oxygen to lithium.

4. A lithium-ion battery comprising the solid-polymer electrolyte membranes of claim 1.

5. A lithium-ion battery comprising the solid polymer electrolyte membranes of claim 2.

6. A fuel cell comprising the solid-polymer electrolyte membranes of claim 1.

7. The solid-polymer electrolyte membrane of claim 1 comprising an organic-inorganic hybrid polymer derived from the reaction of effective amounts of at least one amine selected from the group consisting of polyamines and mixtures of polyamines and monoamines with an epoxy-functionalized alkoxysilane epoxysilane and at least one inorganic alkoxide.

8. Thermal and mechanical stable organic-inorganic hybrid polymers having ion-conductivity derived from the reaction of an effective amount of a mixture of monoamines and diamines with epoxy-functionalized alkoxysilanes to obtain silane monomers; subsequently hydrolytically-condensing said monomers to obtain hybrid polymers.

9. A process for preparing stable organic-inorganic hybrid polymers which comprises reacting effective amounts of a mixture of polyamines and monoamines with epoxy-functionalized alkoxysilanes to obtain silane monomers adding a lithium compound to a solution of said silane monomers and subsequently hydrolytically-condensing said silane monomers to obtain the hybrid polymers.

10. The process of claim 9 wherein the lithium compound is a lithium salt.

* * * * *